United States Patent [19]
Boldt

[11] 4,302,888
[45] Dec. 1, 1981

[54] ROTARY STEAM DRYER CONTROL

[75] Inventor: Robert T. Boldt, Taylor Ridge, Ill.

[73] Assignee: Dickey-john Corporation, Auburn, Ill.

[21] Appl. No.: 15,318

[22] Filed: Feb. 26, 1979

[51] Int. Cl.³ ............................................. F26B 23/10
[52] U.S. Cl. .......................................... 34/48; 34/134; 34/138; 165/88
[58] Field of Search .................. 34/134, 138, 48, 119, 34/124, 51; 165/88, 92; 432/47, 113; 251/129

[56] References Cited

U.S. PATENT DOCUMENTS

| | | | |
|---|---|---|---|
| 2,823,465 | 2/1958 | Armstrong | 34/48 |
| 3,658,642 | 4/1972 | Keyes et al. | 34/48 |
| 3,760,816 | 9/1973 | Wochnowski | 34/48 |
| 3,778,707 | 11/1973 | Vogel | 324/61 R |
| 3,848,342 | 11/1974 | Bartles et al. | 34/48 |
| 4,161,962 | 7/1979 | Maringer et al. | 251/129 |

Primary Examiner—Larry I. Schwartz
Attorney, Agent, or Firm—Trexler, Bushnell & Wolters, Ltd.

[57] ABSTRACT

The disclosure relates to a product moisture control system for use in a product steam dryer of the type which removes moisture from wet product material, wherein the wet product material is contacted with steam tubes for heating the material and evaporating the moisture therein. The control system includes a first control loop which senses the moisture content of the dried material and establishes at predetermined times corrections to the steam pressure within the steam tubes to provide processed material having a desired moisture content. The system also includes a second control loop which continuously detects the steam pressure and maintains the steam pressure substantially constant during the time intervals between the predetermined steam pressure correction times.

16 Claims, 10 Drawing Figures

| TIME | | GRAIN DRYER CONTROLLER LOGIC 25% | |
|---|---|---|---|
| MIN. | MAX. | JUMPER Z TO | JUMPER M TO |
| 6.16 SEC | 36.0 SEC | F | 10 |
| 12.3 SEC | 1.23 MIN | E | 9 |
| 49 SEC | 4.9 MIN | D | 7 |
| 3.3 MIN | 19.7 MIN | C | 5 |
| 13.1 MIN | 1.31 HR | B | 3 |
| 52.5 MIN | 5.25 HR | A | 1 |
| 26.2 MIN | 2.62 HR | G | 2 |
| | | | |
| | | JUMPER K TO 1/4 | |

ROTARY STEAM DRYER CONTROL

BACKGROUND OF THE INVENTION

The disclosure relates generally to rotary steam dryers of the type which dry wet product material such as soybean meal, and more particularly to a control system for use in such a rotary steam dryer.

Dryers for drying wet soybean meal or the like are well known in the art. The most common form of dryer is a rotary steam tube dryer. In such dryers, steam is used as the heating medium. The dryers customarily include a dryer cylinder into which the wet product material to be dried is administered. Extending the length of the dryer cylinder are steam tubes which are arranged in concentric circles. The dryer cylinder and steam tubes are revolved as wet product material is fed continuously into one end of the dryer cylinder through a stationary throat piece so as to be heated by tumbling in direct contact with the steam tubes. The heating of the wet product material by the steam tubes causes the moisture within the wet product material to evaporate. A small air current passing through the dryer cylinder absorbs and carries off the evaporated moisture in the form of water vapor.

Normal operating steam pressure utilized in such systems falls within the range of 0 to 150 pounds per square inch. The drying temperature is definitely established by the steam pressure within the tubes. The amount of steam condensed within the tubes is directly proportional to the heat load. Under no load, very little steam is condensed, only that required for radiation and stack losses. When wet product material is introduced into the dryer cylinder, the rate of condensation of the steam within the steam tubes increases and continues to increase until the system reaches equilibrium.

Such dryers are constant temperature variable heat input devices if the steam pressure within the steam tubes is maintained constant. Thus, for a given heat load, the pressure of the steam and subsequently the temperature are determined by the parameters of the system. If the pressure is maintained constant, the system will supply the necessary steam to supply the demands of the heat load.

The steam is fed into the tubes through a proportioning steam valve controlled by a dryer control. One such dryer control is fully described and claimed in U.S. Pat. No. 3,778,707 which issued on Dec. 11, 1973 to the Assignee of the present invention. The dryer control described in that patent includes a moisture detector as the moisture measurement device. The moisture detector is at the discharge of the dryer and continuously senses the moisture content of the product material being discharged from the dryer. The moisture detector provides an electrical signal which is proportional to the product material mositure and is coupled back to a mositure display where the moisture is continuously displayed on a meter which reads out directly in percent moisture. The display of the system also scales the electrical signal and sends it to the controller portion of the system. The controller periodically compares the moisture signal to an operator selected moisture setpoint and makes corrections in the opening of the proportioning steam valve. The amount of valve opening depends upon whether the processed product material moisture content is above or below the setpoint. The sampling period of the controller is dependent on the through time of the dryer with the period somewhat longer than the through time.

While such rotary dryer systems have represented a great advancement in the art, there remains substantial room for improvement. Because the sampling or correction intervals are quite long, on the order of 30 minutes, changes in heat load to the dryer can cause substantial condensation of the steam and loss of steam pressure within the steam tubes so that the wet product material to be dryed is not sufficiently dried. Hence, a lag problem has resulted by virtue of the fact that the steam pressure within the steam tubes varies with changing heat loads during the sampling or correction intervals. Therefore, large material feed rate variations result in large deviations in output moisture because no corrections in steam pressure are made between correction intervals. In extreme cases, water-logging of the dryer has resulted by virtue of a greatly increased feed rate during the correction intervals.

It is therefore a general object of the present invention to provide a new and improved rotary steam dryer for drying wet product material such as soybean meal or the like.

It is a more particular object of the present invention to provide a new and improved control system for use in such a rotary steam dryer.

It is a more particular object of the present invention to provide a new and improved control system for use in a material product steam dryer which not only provides corrections in steam pressure at periodic intervals, but also, continuously senses the steam pressure and maintains the steam pressure substantially constant during the periodic intervals.

SUMMARY OF THE INVENTION

The invention therefore provides a product moisture control system for use in product steam dryer of the type which removes moisture from wet product material, wherein the wet product material is contacted with steam tubes for heating the wet material and evaporating the moisture therein and wherein the resulting evaporation is thereafter removed from the processed material. The control system comprises moisture detecting means for detecting the moisture content of the process product material at predetermined times separated in time by time intervals, steam pressure control means coupled to the moisture detecting means for establishing a steam pressure within the steam tubes at the predetermined times responsive to the moisture content of the processed product material, and steam pressure detecting means for continuously sensing the steam pressure within the steam tubes and being coupled to the steam pressure control means for causing the steam pressure control means to maintain the steam pressure within the steam tubes substantially constant during each said time interval.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
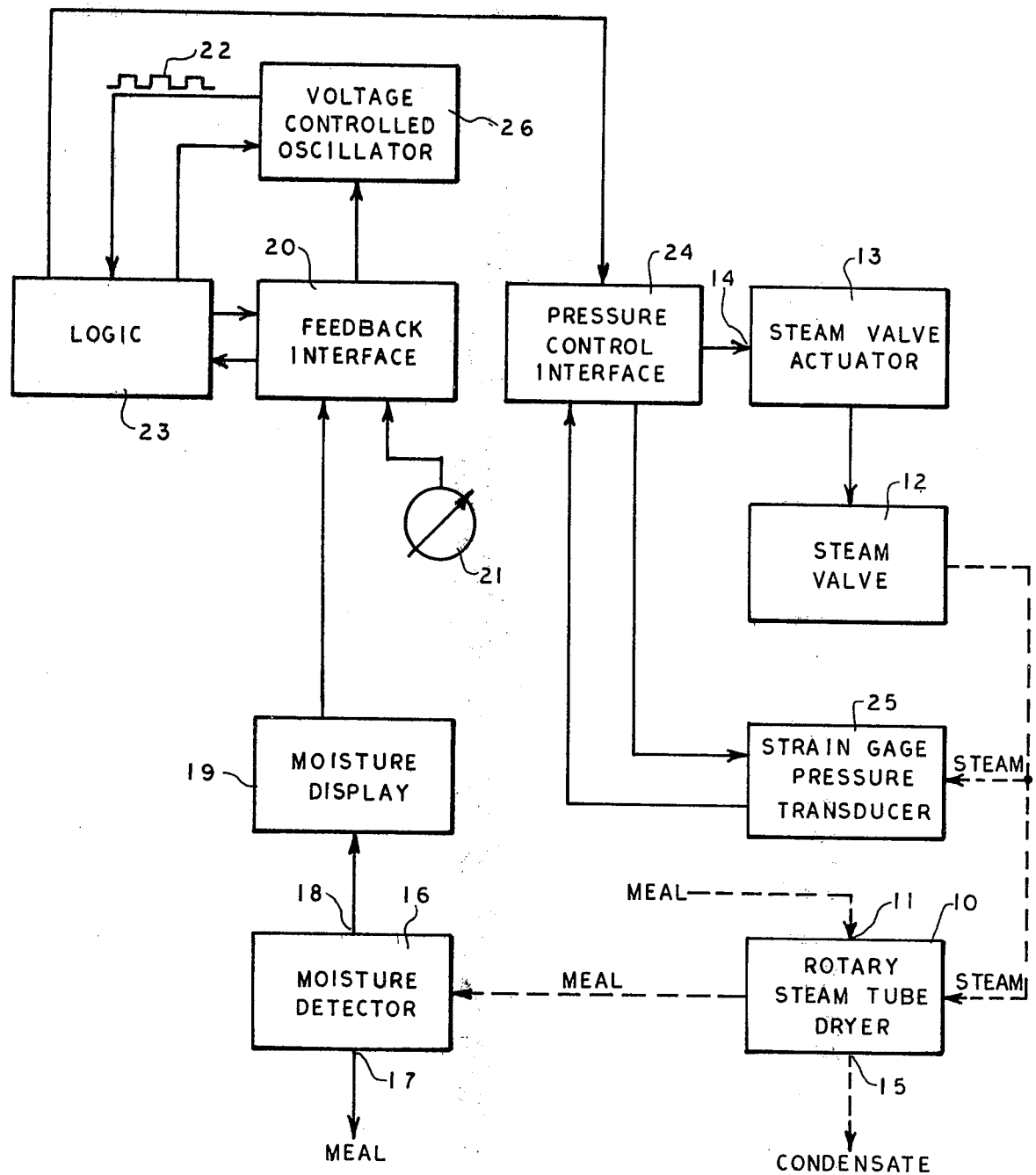
FIG. 1 is a block diagram of a rotary steam dryer system incorporating a control system embodying the present invention.

Referring now to FIG. 1, the rotary steam tube dryer 10 is of the type which includes a cylindrical housing into which wet product material such as soybean meal is administered through a throat piece identified schematically at 11. Within the cylinder of the dryer are a plurality of steam tubes arranged in concentric circles and extend along the length of the dryer cylinder. The steam tubes are connected to a steam valve 12 which administers steam pressure to the steam tubes. The steam valve 12 is controlled by a steam valve actuator 13 which sets the opening of the steam valve by an amount proportional to the magnitude of an applied electrical signal at its input 14. Hence, the steam valve actuator 13 and steam valve 12 form a steam pressure control means which establishes a required steam pressure within the steam tubes to facilitate drying of the wet meal to a desired moisture content.

As the wet meal is administered to the dryer at its throat 11, the cylinder and steam tubes are rotated in unison causing the meal to be thoroughly mixed and contacted with the steam tubes so as to be heated thereby. The heating of the wet meal causes the moisture within the meal to evaporate. Steam leaves the tubes through output manifold 15 of the dryer.

The dried meal is then transferred to a moisture detector 16 which preferably is of the form fully described in U.S. Pat. No. 3,778,707 which issued on Dec. 11, 1973 to the assignee of the present invention, and which patent is incorporated herein by reference. The dried meal passes by the moisture detector and is outputed from the steam dryer at output 17 and thereafter conveyed to a suitable container. The moisture detector 16 provides an electrical signal at its output 18 which has a magnitude proportional to the moisture content of the dried meal.

The moisture content level signal provided by the moisture detector 16 at its output 18 is transferred to a moisture display 19 where the moisture content of the dried meal is displayed on a meter or chart recorder in a precentage. The moisture content level signal is also conveyed from the moisture display 19 to feedback interface 20. A moisture setpoint potentiometer 21 is also coupled to the feedback interface 20 which provides an electrical signal having a magnitude related to the desired moisture content of the processed meal.

The feedback interface includes a comparing means to be more fully described hereinafter, which compares the mositure content of the processed meal to the desired moisture content as set by the moisture setpoint potentiometer 21. As a result of that comparison, the difference between the moisture content of the processed material and the desired moisture content of the processed material is determined and results in the production of a difference signal which is conveyed by the feedback interface 20 to a voltage controlled oscillator 26.

The voltage controlled oscillator 26 develops a series of pulses 22 which occur at a frequency which is proportional to the difference signal applied to the voltage controlled oscillator 21. The voltage controlled oscillator 21 also generates a series of timing pulses which are utilized for timing the operation of the control system.

The voltage controlled oscillator 26 is coupled to the logic portion 23 of the control system, which logic porion 23 counts the pulses 22 provided by the voltage controlled oscillator 21 during an entire steam pressure correction interval or a portion thereof. As the logic 23 counts the pulses 22, the number of pulses counted are stored with the total number of pulses counted representing an average of the moisture content of the processed meal over each of a continuous series of correction intervals. The logic 23, as will be more fully described hereinafter, includes an analog-to-digital converter which provides an analog signal responsive to the number of pulses counted which defines an error signal representing the difference between the average moisture content of the processed meal and the desired moisture content as set by the moisture set point potentiometer 21. The magnitude of the error signal is such that it provides a correction to the steam valve 12 by the steam valve actuator 13 so that at predetermined times separate in time by predetermined timed intervals, herein referred to as the correction intervals, the steam pressure within the steam tubes of the dryer is varied to the ultimate end of providing processed meal having a moisture content equal to the desired moisture content.

As can be seen from the figure, the logic 23 is also coupled back to the voltage controlled oscillator 26. The voltage controlled oscillator provides the pulses 22 at a frequency which is not only proportional to the difference signal provided by the feedback interface 20, but which is also related to the average moisture content developed by the logic 23 during the immediately preceding correction interval. Hence, if there is no error, the voltage controlled oscillator 26 will provide the pulses 22 at the same frequency from one correction interval to the next.

The feedback interface 20 is coupled to the logic 23 so as to set the mode of operation of the logic for either automatic or manual operation. The logic 23 is in turn coupled to the feedback interface 20 to provide the feedback interface with its analog signal when the system is operative in the manual mode. Lastly, the logic 23 is coupled to the pressure control interface 24 which includes a current source which provides a current proportional to the magnitude of the analog signal provided by the logic 23 which, as previously explained, represents the degree of correction necessary for the steam pressure.

The pressure control interface 24 is coupled to the steam valve actuator 13 at input 14. As a result, the current source within the pressure control interface, upon receiving the error signal from the logic 23, will impress upon the steam valve actuator 13 a current having a magnitude which causes the steam valve actuator 13 to open the steam valve 12 by an additional amount to provide additional steam pressure to the steam tubes of the dryer 10 to the ultimate end of providing processed material having a desired moisture content.

From the foregoing, it can therefore be seen that the moisture detector 16, moisture display 19, feedback interface 20, voltage controlled oscillator 26, and logic 23 comprise a first control loop which detects the moisture of the processed material and provides, at predetermined times separated in time by periodic time intervals, a correction in the valve opening of steam valve 12 to establish a pressure within the dryer steam tubes which will cause the dryer to provide process meal having a desired moisture content. However, because the correction intervals may encompass a substantial period of time, usually slightly longer in time than the through put time of the dryer, variations in steam pressure may result should an increased or decreased load be placed on the system, either an increased or decreased feed rate of wet meal into the dryer, or by introducing into the dryer meal to be processed which is of higher or lower moisture content than previously-processed meal. For example, a greater load thus placed on the dryer, steam within the steam tubes will condense causing a drop in steam pressure and thus to cause a reduction in drying temperature and system drying capacity.

In order to overcome the possible variations in steam pressure, and to thereby assure adequate drying of the wet meal during the correction intervals, a second control loop is provided in the form of a strain gauge pressure transducer 25 and accompanying circuitry contained within the pressure control interface 24. The strain gauge pressure transducer 25 is coupled to the steam valve 12 and continuously senses or detects the steam pressure. The strain gauge pressure transducer 25 provides an electrical signal to the pressure control interface 24 which has a magnitude proportional to the steam pressure. If the steam pressure decreases, the strain gauge pressure transducer 25 output signal will decrease in amplitude. The decrease in amplitude of the strain gauge transducer signal causes the pressure control interface, in a manner to be more fully described hereinafter, to provide a pressure control signal to the steam valve actuator 13 to cause the steam valve actuator 13 to open the steam valve 12 by an amount sufficient to return the steam pressure of the dryer system to the steam pressure established during the beginning of the correction interval. Hence, as a result, the first control loop establishes a steam pressure at predetermined correction times, the second control loop maintains the steam pressure substantially constant during the correction intervals between the predetermined correction times.

Figure 2:
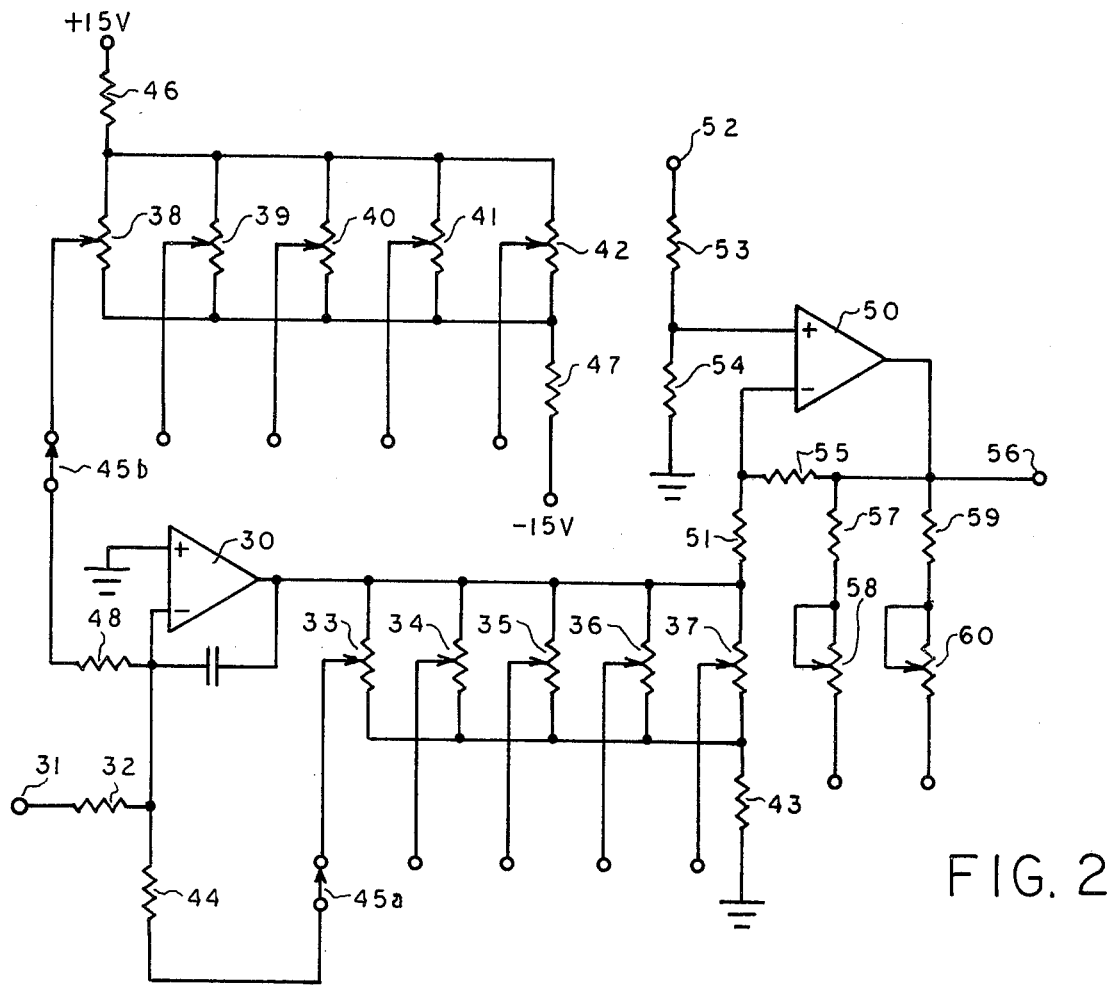
FIG. 2 is a schematic diagram of the moisture display of FIG. 1.

Now that the control system has been described in general terms, reference may be had to FIGS. 2 through 10 which illustrate the steam dryer control system in more specific detail. Referring now to FIG. 2, there is shown a schematic circuit diagram of a portion of the moisture display 19 of FIG. 1 which provides for the display of the detected moisture content of the processed meal and which also provides the electrical signal which has a magnitude proportional to the detected moisture content. An operational amplifier 30 has an inverting input connected to the output of the moisture detector 16 at an input terminal 31 and a non-inverting input coupled to ground. The input 31 is connected to the inverting input of operational amplifier 30 by a resistor 32. Associated with the operational amplifier 30 are a plurality of range adjustment potentiometers 33 through 37 and a like plurality of zero adjust potentiometers 38 through 42. The range adjustment potentiometers 33 through 37 are coupled together in parallel relation having their common junctions at one end coupled to the output of the operational amplifier 30, and their common junction at their other ends coupled to ground through a resistor 43. The wipers of the potentiometers 33 through 37 are selectively coupled to the inverting input of the operational amplifier 30 through a resistor 44 by a switch 45a. The zero adjustment potentiometers 38 through 42 are similarly connected together in parallel relation with their common junctions at one end being coupled to a plus 15 volt power source, and with their common junction at their other ends coupled to a minus 15 volt power source by a resistor 47. The wipers of the potentiometers 38 and 42 are selectively coupled to the inverting input of operational amplifier 30 through a resistor 48 by another select switch 45b. Preferably, switches 45a and 45b are controlled by a common shaft so that each one of the zero adjust pots corresponds to a respective one of the range adjust pots. By virtue of this arrangement, the output of the operational amplifier 30 provides a 0 to 0.5 volt electrical signal defining the entire moisture range of the detected moisture contents of the processed meal.

The output of the operational amplifier 30 is coupled to the inverting input of operational amplifier 50 by a resistor 51. The non-inverting input of operational amplifier 50 is connected to a meter offset voltage applied to terminal 52 by a resistor divider comprising resistors 53 and 54. The meter offset voltage provides a correction for any zero offset error which may occur in the display meters or chart recorders.

Feedback between the output of operational amplifier 50 and the inverting input of operational amplifier 50 is provided by a resistor 55. The operational amplifier 50 and its accompanying circuitry is arranged to provide a voltage gain of 10, thus providing a 0 to 5 volts output signal at output terminal 56 which output signal represents the moisture content of the processed meal.

A chart recorder for graphically displaying the detected moisture content may be coupled to the output of operational amplifier 50 by a resistor 57 and a potentiometer 58. The resistor 57 and potentiometer 58 provide to a chart recorder a 0 to 1 milliampere signal representative of the detected moisture content.

Similarly, a remote recorder or moisture meter may be coupled to the output of operational amplifier 50 by a resistor 59 and potentiometer 60. The resistor 59 and potentiometer 60 provide a 0 to 1 milliampere signal for the remote recorder or moisture meter which is representative of the detected moisture content.

Figure 3:
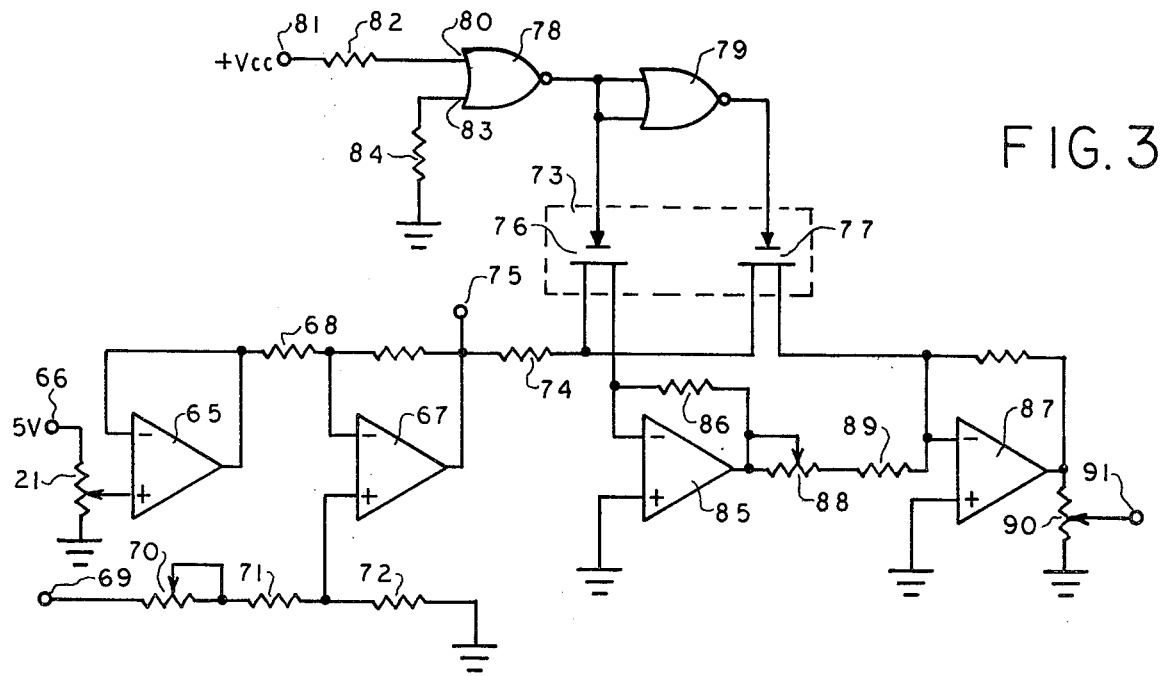
FIG. 3 is a detailed schematic circuit diagram of a portion of the feedback interface of FIG. 1.

Referring now to FIG. 3, there is shown the portion of the feedback interface 20 which provides the difference signal representing the difference between the desired moisture content of the processed meal and the detected moisture content of the processed meal. Operational amplifier 65 has a non-inverting input connected to the wiper of the moisture set point potentiometer 21. The moisture set point potentiometer 21 is coupled to a positive five volt supply at terminal 66 so that its wiper provides the non-inverting input of operational amplifier 65 with a voltage potential in the range of 0 to 5 volts for setting the desired moisture content of the processed meal. The output of operational amplifier 65 is coupled to its inverting input and also to the inverting input of operational amplifier 67 by a resistor 68. The non-inverting input of operational amplifier 67 is coupled to the output terminal 56 (FIG. 2) at its input terminal 69 by a voltage divider comprising potentiometer 70, and resistors 71 and 72. Because the voltage at terminal 69 is representative of the detected moisture content of the processed material, the operational amplifier 67 is provided with the desired set point at its inverting input and a detected moisture content level at its non-inverting input. Hence, the operational amplifier 67 will provide at its output a difference signal which represents the difference between the detected moisture content and the desired moisture content of the processed meal. The difference signal is applied to a solid state switch 73 by a resistor 74 and to test point terminal 75 whereat the difference signal magnitude may be directly measured.

The solid state switch 73 is a dual switch including a first switch 76 and a second switch 77. A pair of NOR gates 78 and 79 control the switches 76 and 77. To that end, NOR gates 78 has an input 80 connected to a positive voltage source at terminal 81 by a resistor 82 and another input 83 connected to ground by a resistor 84. Hence, NOR gate 78 will provide at its output a logical O signal. The logical O signal provided at the output of NOR gate 78 is coupled to the inputs of the NOR gate 79 and also to the gate of switch 76 to thus turn on switch 76. The logical zero level signal at the inputs of NOR gate 79 will cause a high level logical signal to appear at the output of NOR gate 79. The output of NOR gate 79 is coupled to the gate of switch 77 to thereby turn switch 77 off.

The difference signal appearing at the output of operational amplifier 67 is thus coupled to the inverting input of operational amplifier 87 by resistor 74. The non-inverting input of operational amplifier 87 is coupled to ground and feedback is provided between its output and its inverting input by a resistor. The non-inverting input of operational amplifier 87 is coupled to ground. The difference signal at the output of operation amplifier 67 is a positive voltage when the moisture signal line exceeds the command signal level and Amplifier 87 inverts the signal from operational amplifier 67. The resulting signal from operational amplifier 87 increases negatively as moisture increases over the moisture set point. The voltage at the output of operational amplifier 87 is scaled by a potentiometer 90 which provides at its wiper 91 a voltage signal which defines the difference signal scaled by an appropriate factor having a magnitude herein referred to as the correction magnitude.

Figure 4:
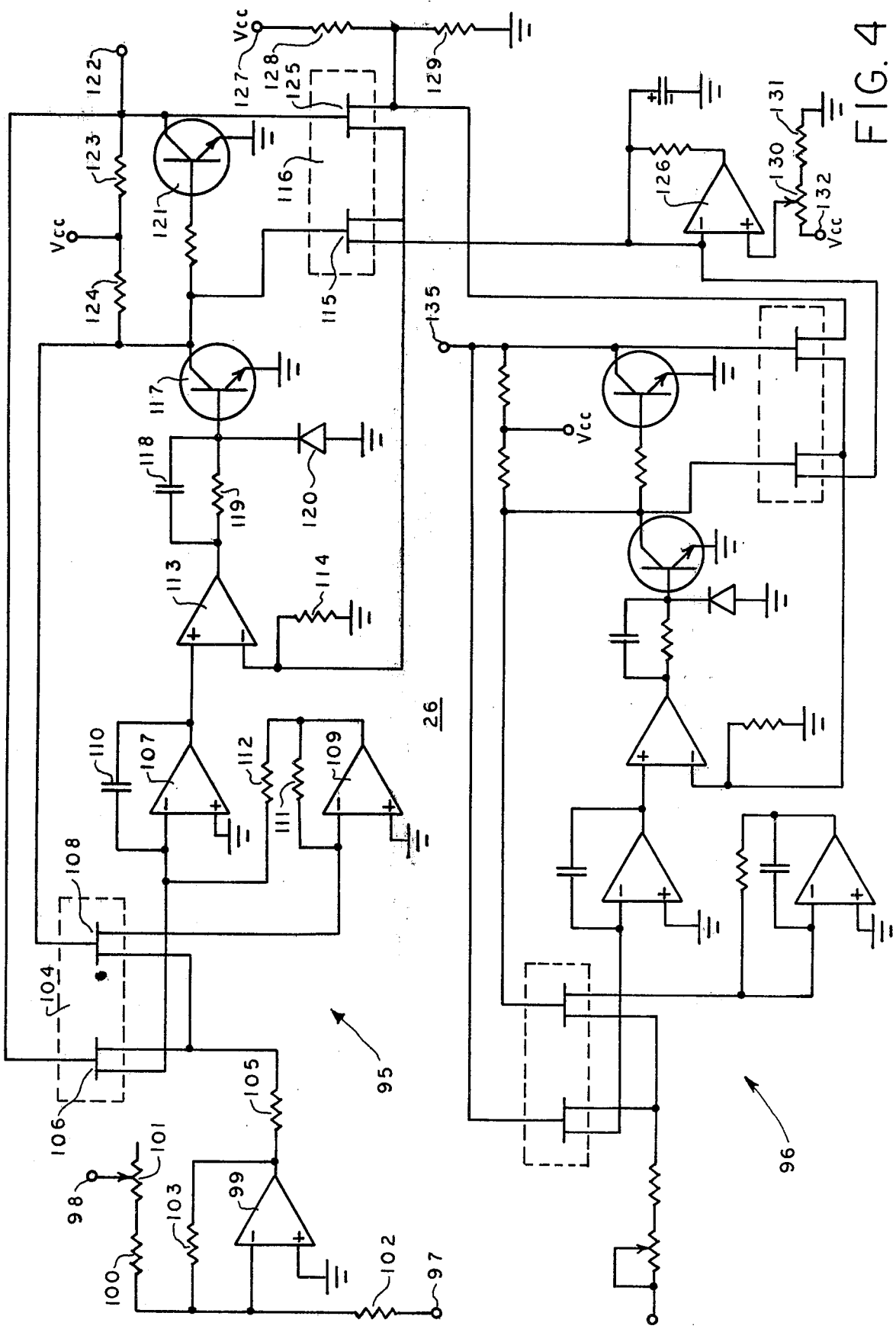
FIG. 4 is a detailed schematic circuit diagram of the voltage controlled oscillator of FIG. 1.

Referring now to FIG. 4, FIG. 4 is a detailed schematic circuit diagram of the voltage controlled oscillator 26 of FIG. 1. The voltage controlled oscillator 26 includes a pair of voltage controlled oscillators, namely, oscillator 95 and oscillator 96. Oscillator 95 comprises an error oscillator and oscillator 96 comprises a time keeping oscillator. Each oscillator provides a series of output pulses at a frequency proportional to the voltages applied to the oscillators.

The voltages applied to oscillator 95 are the correction magnitude signal from potentiometer 90 of FIG. 3 which represents the scaled difference between the desired set point moisture content of the processed meal and the actual moisture content of the processed meal, and an analog voltage signal provided by the logic 23 (FIG. 1) which the logic produces in response to the output frequency of the oscillator 95. The correction magnitude signal is applied to the oscillator 95 at an input terminal 97 and the analog voltage signal from the logic is provided at an input terminal 98. To be more specific, as previously explained, the first control loop senses the moisture content of the processed meal and provides a correction to the setting of the steam valve 12 at predetermined correction times. The correction times are separated in time by correction intervals. The correction magnitude applied to terminal 97 of the voltage controlled oscillator as is caused to appear during each correction interval. As the correction magnitude is applied to the terminal 97, the output of the logic is applied to terminal 98 which analog signal from the logic represents the averaged error during the immediately preceding correction time interval. The correction time interval is determined by the logic in response to the pulses provided by the voltage controlled oscillator 96 as will be described subsequently.

The voltage controlled oscillators 95 and 96 are substantially identical, and therefore, only voltage controlled oscillator 95 will be described in detail herein. The voltages at terminals 97 and 98 which are applied to the voltage controlled oscillator 95 are applied to the inverting input of operational amplifier 99. The analog signal from the logic at terminal 98 is applied to the inverting input of operational amplifier 99 through a resistor 100 and a potentiometer 101 which scales the analog signal at terminal 98 in a manner similar to the scaling of the difference signal by the potentiometer 90 of FIG. 3 which derives the correction magnitude. The correction magnitude at terminal 97 is applied to the inverting input of operational amplifier 99 by a resistor 102. The non-inverting input of operational amplifier 99 is coupled to ground. Feedback from the output to the inverting input of operational amplifier 99 is provided by a resistor 103. The output of operational amplifier 99 is coupled to a first switch 106 of solid state switch 104 by a resistor 105. Switch 106 is also coupled to an inverting input of operational amplifier 107 and to the other switch 108 of solid state switch 104. The other switch 108 is also coupled to the inverting input of operational amplifier 109. The non-inverting input of operational amplifiers 107 and 109 are both coupled to ground. Feedback from the output to the inverting input of operational amplifier 107 is provided by a capacitor 110. Also, feedback from the output to the inverting input of operational amplifier 109 is provided by a resistor 111. The output of operational amplifier 109 is also coupled to the inverting input of operational amplifier 107 by a resistor 112.

The output of operational amplifier 107 is coupled to the non-inverting input of operational amplifier 113 which has an inverting input coupled to a first switch 115 of solid state switch 116. The output of operational amplifier 113 is coupled to the base of transistor 117 by the parallel combination of capacitor 118 and resistor 119. The base of transistor 117 is also coupled by ground by a diode 120.

The emitter of transistor 117 is coupled to ground and its collector is coupled to the gate of the second switch 108 of solid state switch 104, to the base of transistor 121, and to the output of the voltage control oscillator 95 at terminal 122 by resistors 123 and 124. The output terminal 122 is also coupled to the gate of the first switch 106 of solid state switch 104 and to the collector of transistor 121. The collector of transistor 121 is also coupled to the gate of the second switch 125 of solid state switch 116. The switches 115 and 125 are coupled together. Switch 115 is also coupled to operational amplifier 126 which has its non-inverting input coupled to the logic to be described hereinafter for accepting a timing signal therefrom. The second switch 125 of solid state switch 116 is also coupled to a positive voltage potential applied at terminal 127 by a resistor divider comprising resistors 128 and 129.

In operation of the voltage controlled oscillator 95, the two voltages applied at terminals 97 and 98 are summed at the inverting input of operational amplifier 99. The output of operational amplifier 99 is applied through resistor 105 to the inverting input of operational amplifier 107 through switch 106. Operational amplifier 107 is connected as an integrator with a linear ramp rate. Operational amplifier 107 inverts the voltage applied at its input so that for a positive signal at its inverting input, the output ramps in a negative direction. The direction of the ramp depends on which of the switches 106 and 108 of solid state switch 104 is on since switch 108 applies a negative voltage through the inversion by operational amplifier 109 causing a positive going ramp.

Operational amplifier 113 is connected as a comparator whose output is saturated positive when the voltage on its non-inverting input is greater than the voltage at its inverting input, and is saturated negative when the voltage on its inverting input is greater than the voltage on its non-inverting input. With the output of operational amplifier 113 saturated positive, transistor 117 is biased on, transistor 121 is biased off, and output terminal 122 is at a high logic level. The high logic level at output terminal 122 turns on switch 106 applying a positive voltage on the inverting input of operational amplifier 107 causing it to ramp in a negative going direction. The voltage on the non-inverting input of operational amplifier 113 continues to ramp downward until it drops below the voltage at its inverting input. The output of operational amplifier 113 immediately swings into negative saturation turning on transistor 117 and turning off transistor 121. The voltage at the collector of transistor 117 turns on switch 108 so that a voltage is applied to operational amplifier 107 through the inverting amplifier 109. The applied voltage is negative causing operational amplifier 107 to ramp in a positive direction. Operational amplifier 113 at its inverting input is now referenced to the voltage applied by operational amplifier 126 through the turned on switch 115.

Thus, the oscillator ramps in a positive direction to a value set by operational amplifier 126 and in a negative direction to a value set by the voltage divider comprising resistors 128 and 129. The output of operational amplifier 107 is a triangle wave oscillating between a minimum and a maximum voltage depending on the correction interval set by resistors 130 and 131 connected to a positive voltage source at terminal 132, which derived voltage is coupled to the non-inverting input of operational amplifier 126. The output at output terminal 122 is a square wave as is the output signal at output terminal 135 of voltage control oscillator 96.

Figure 5:
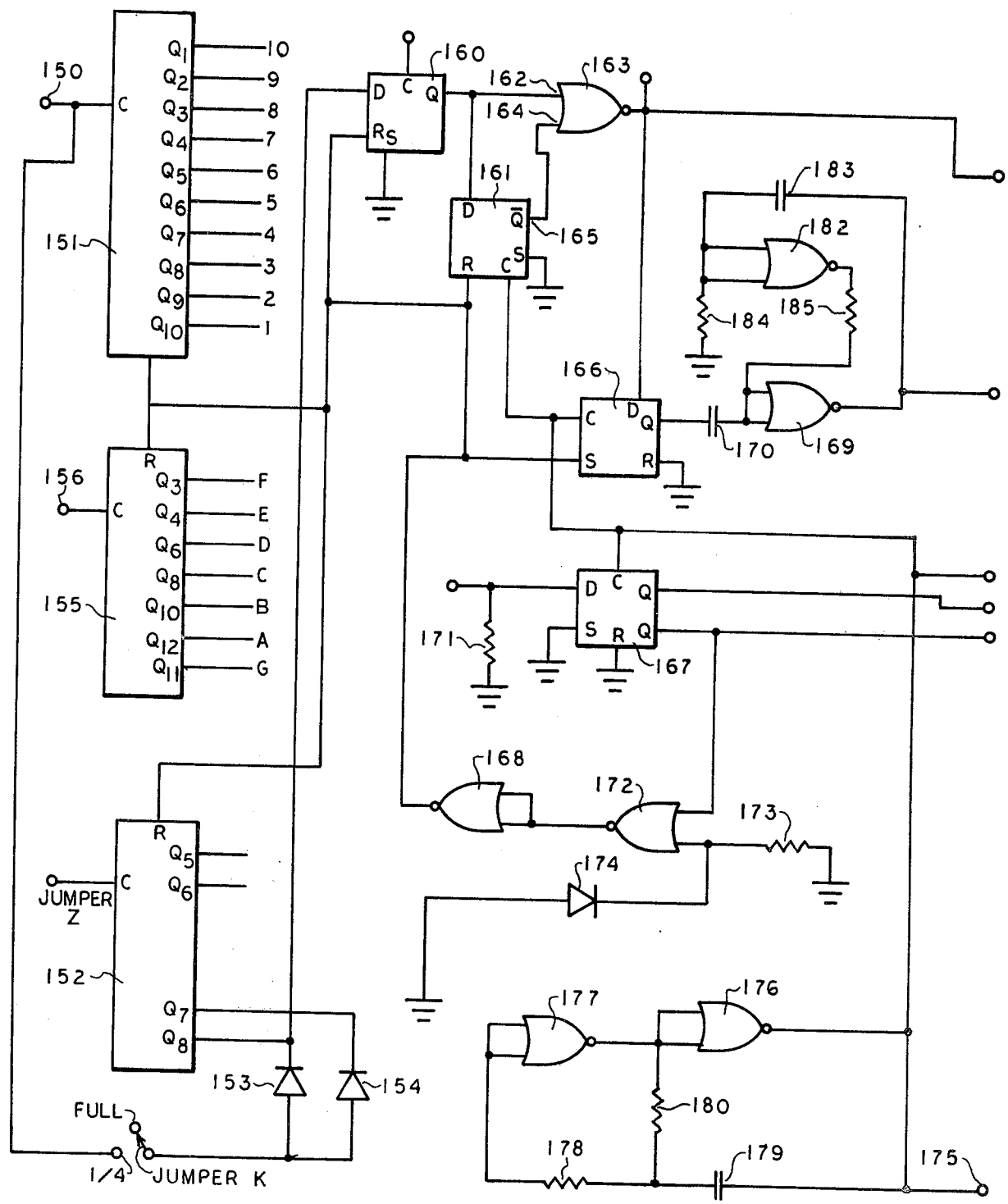
FIGS. 5 and 6 when taken together are a detailed schematic circuit diagram of the logic portion of the control system embodying the present invention illustrated in FIG. 1.
Figures 6, 7:
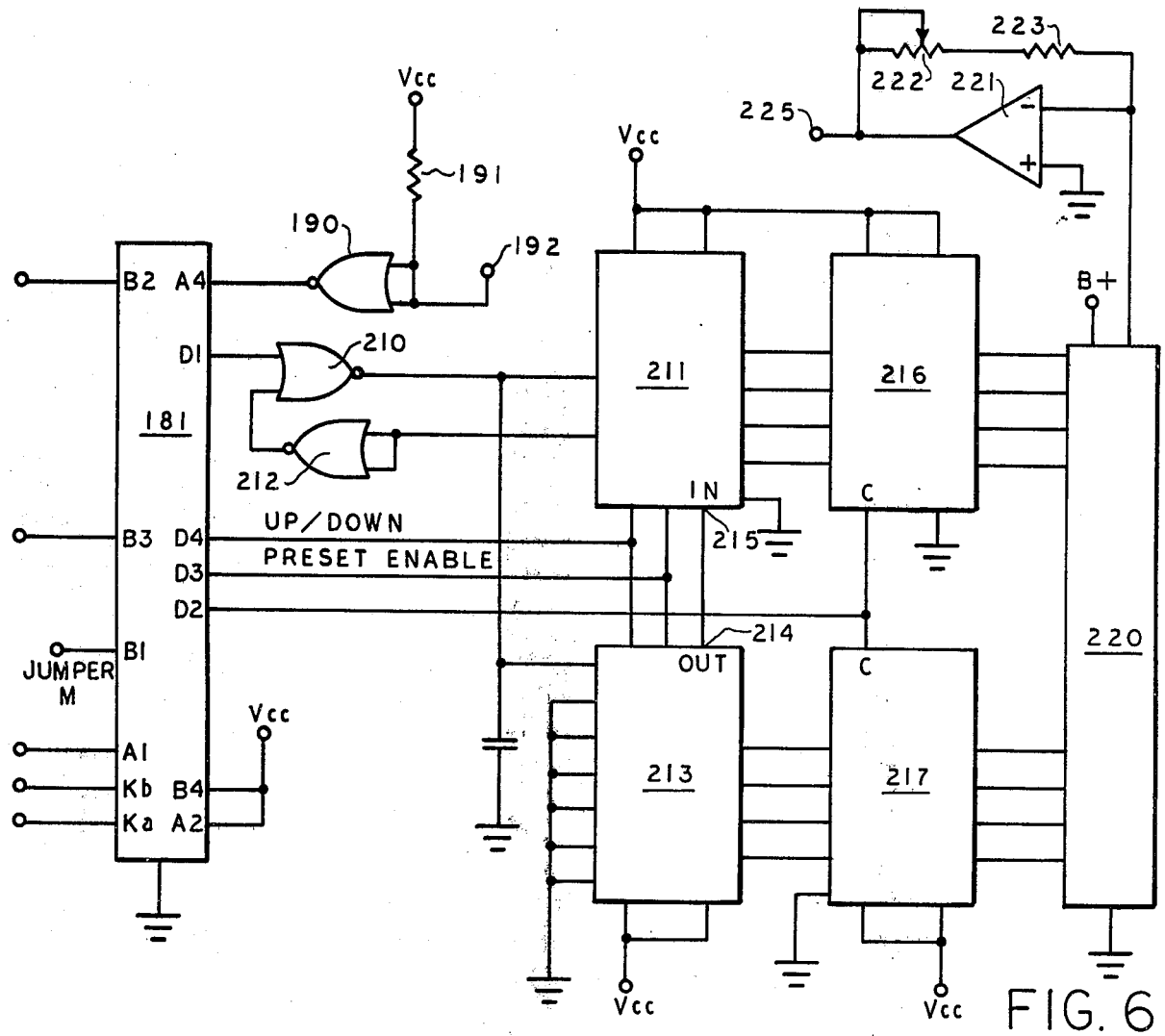
FIG. 7 is a chart representing the various operational conditions which may be imposed upon the system logic of FIGS. 5 and 6 depending upon different through process times of a rotary dryer embodying the present invention.

The error clock frequency provided by voltage controlled oscillator 95 is a function of the voltage at the non-inverting input of operational amplifier 126 as well as the voltages appearing at terminals 97 and 98 from the feedback interface of FIG. 3 and the logic of FIGS. 5 and 6, respectively. Both oscillators are synched through the voltage appearing at the non-inverting input of operational amplifier 126. A change in the voltage at the non-inverting input of operational amplifier 126 causes both oscillators to change in frequency in the same proportion. The correction magnitude voltage applied to terminal 97 is the error signal (output moisture set point minus output moisture). The voltage at terminal 98 is the output voltage of the digital-to-analog converter of the logic of FIGS. 5 and 6. The value of the voltage at terminal 98 depends upon the values derived during the last or immediately preceding correction time period. The algebraic sum of the voltage at terminals 97 and 98 sets the oscillation rate of the voltage controlled oscillator 95. If the correction magnitude voltage at terminal 97 is zero, the voltage controlled oscillator 95 oscillates at constant frequency since the voltage at terminal 98 remains constant. If a signal appears on terminal 97 (meaning an error exists), the frequency rate changes at each correction time period.

Referring now to FIGS. 5 and 6, they show, when taken together, the logic 23 of the system of FIG. 1. The logic of FIGS. 5 and 6 generate an analog correction signal based upon the error proportional frequency supplied by the voltage controlled oscillator 95 at its output terminal 122. The logic also determines the correction interval (correction time periods) when the system is in automatic control.

The error clock frequency produced by the voltage controlled oscillator 95 at its output terminal 122 is applied to logic input terminal 150. Terminal 150 is coupled to the clock input of a frequency divider 151. Terminal 150 is also coupled to the Q7 and Q8 outputs of counter/divider 152 through diodes 153 and 154 by a Jumper K. The reset input of counter 151 is coupled to the reset input of counter/divider 155. The clock input of counter/divider 155 is connected to an input terminal 156 which is in turn connected to the output terminal 135 of voltage controlled oscillator 96 to receive the interval time clock pulses therefrom.

The clock input (JUMPER Z) of counter/divider 152 is coupled to one of the outputs, Q3 through Q12, which are identified by capital letters A through G as shown. The clock input of counter/divider 152 is coupled to one of the outputs A through G as called for by the chart of FIG. 7 which will be referred to subsequently. The reset inputs of the counter/dividers 151, 152, and 155 are all coupled to the reset input of a CD4013 flip-flop 160 and to the reset input of the CD4013 flip-flop 161. The $Q^8$ output of counter/divider is coupled to the D input of flip-flop 160. The Q output of flip-flop 160 is coupled to an input 162 of NOR gate 163. NOR gate 163 has another input 164 coupled to the $\bar{Q}$ output 165 of flip-flop 161. The set input of flip-flop 161 is coupled to ground.

The clock input of flip-flop 161 is coupled to the clock input of CD4013 flip-flop 166 and to the clock input of the CD4013 flip-flop 167. The reset inputs of the counter/dividers 151, 152 and 155 are also coupled to the reset input of flip-flop 161 and to the set input of flip-flop 166 and the output of NOR gate 168. The reset input of flip-flop 166 is coupled to ground and its D input is coupled to the output of NOR gate 163. The Q output of flip-flop 166 is coupled to the inputs of NOR gate 169 by a capacitor 170.

Figure 9:
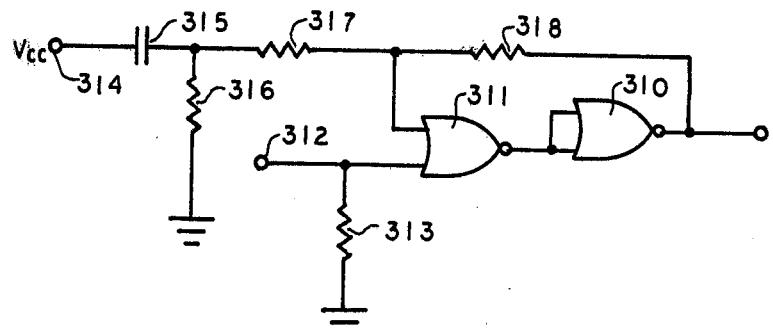
FIG. 9 is a schematic circuit diagram of the portion of the feedback interface of FIG. 1 which sets the control system in either an automatic or manual operating mode.

The D input of flip-flop 167 is coupled to the restart mode circuit of FIG. 9. The set input of flip-flop 167 is coupled to ground as is its reset input.

The inputs of NOR gate 168 are coupled to the output of NOR gate 172 which has one of its inputs coupled to the Q output of flip-flop 167, and its other input coupled to ground by resistor 173 and to ground by diode 174.

The clock input of flip-flop 167 is also coupled to terminal 175 which provides a manual clock output and to an output of NOR gate 176. The inputs of NOR gate 176 are coupled to the output of NOR gate 177 and to the junction of resistor 178 and capacitor 179 by resistor 180. The resistor 178 and capacitor 179 couple the inputs of NOR gate 177 to the terminal 175.

An and/or select gate 181 is provided for transferring data and timing signals from one portion of the logic to the other in a manner to be described subsequently. The select gate 181 is of a type generally known as a CD4019 and/or select gate. When its control input $K_a$ is high and its control input $K_b$ is low, the data on its consecutively numbered D terminals appears on the consecutively numbered respective A terminals. Conversely, when control input $K_b$ is high and control input $K_a$ is low, the data appearing on the consecutively numbered D terminals appears on the consecutively numbered respective B terminals. Of course, data can pass in either direction between the D and A and D and B terminals.

The output of NAND gate 163 is connected to the B2 terminal of the select gate 181. The output of NOR gate 169 is coupled to the B3 terminal of select gate 181 and to the inputs of NOR gate 182 by a capacitor 183 with the inputs of NOR gate 182 also being coupled to ground by a resistor 184. The output of NOR gate 182 is coupled to the inputs of NOR gate 169 by a resistor 185.

The clock inputs of flip-flops 166 and 167 are coupled to the A1 terminal of select gate 181, and the $K_a$ and $K_b$ control inputs are coupled to the Q and $\overline{Q}$ outputs respectively of flip-flop 167. The B1 terminal of select gate 181 is selectively coupled to one of the $Q_1$ through $Q_{10}$ outputs of counter/divider 151 which are numbered consecutively 10 through 1, respectively. The terminal B1 (JUMPER M) is connected to one of the output terminals of the counter/divider 151 in accordance with the chart of FIG. 7 as explained subsequently.

Figure 10:
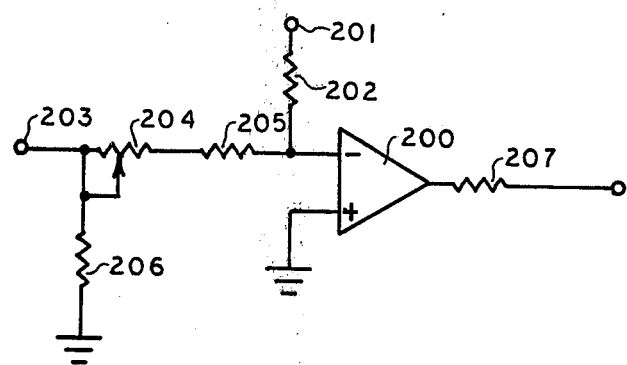
FIG. 10 is a schematic circuit diagram of the portion of the feedback interface which provides manual adjustment of the control system when in the manual mode.

The $A_4$ terminal of select gate 181 is connected to the output of NOR gate 190, and the inputs of NOR gate 190 are connected to a positive voltage source through a resistor 191 and to the moisture direction circuit of FIG. 10 at terminal 192. The moisture direction circuit of FIG. 10 is utilized when the system is placed in the manual mode. Referring briefly to FIG. 10, it includes an operational amplifier 200 having its inverting input connected to a potentiometer (not shown) at a terminal 201 by a resistor 202 which potentiometer applies to the inverting input a voltage in the range of 0 to 5 volts. The inverting input is also coupled to the output of the logic at a terminal 203 by a potentiometer 204 and a resistor 205. The terminal 203 is also coupled to ground by a resistor 206. The operational amplifier 200 has a non-inverting input coupled to ground and its output is coupled to the inputs of NOR gate 190 by a resistor 207. The voltage applied at terminal 201 is summed with the voltage from the logic card as applied at terminal 203 by means of the operational amplifier 200 which takes the form of an open loop amplifier. The operational amplifier 200 saturates at positive polarity if the logic output exceeds the manual potentiometer input voltage applied at terminal 201. Conversely, the operational amplifier 200 saturates in the negative direction if the manual potentiometer voltage applied at terminal 201 exceeds the logic card output voltage.

Referring once again to FIGS. 5 and 6, select gate terminal D1 is coupled to an input of NOR gate 210 which has an output coupled to up/down counter 211. NOR gate 210 also has an input coupled to an output of NOR gate 212. The inputs to NOR gate 212 are also coupled to the up/down counter 211.

Terminal D4 of select gate 181 is coupled to the up/down inputs of counters 211 and 213. Terminal D3 is connected to the preset enable input of the counters 211 and 213. The carry output 214 of counter 213 is coupled to the carry input 215 of up/down counter 211. The terminal D2 of select gate 181 is coupled to the enable or clock inputs of a pair of latches 216 and 217. The latch 216 has a plurality of inputs which are connected to respective outputs of counter 211, and similarly, latch 217 has a plurality of inputs coupled to the respective outputs of counter 213. Lastly, terminals $B^4$ and $A^2$ are coupled to a positive voltage source.

The latches 216 and 217 each have a plurality of outputs coupled to respective inputs of the digital-to-analog converter 220 of the logic circuit. The output of the digital-to-analog converter 220 is coupled to the inverting input of an operational amplifier 221. Operational amplifier 221 has a non-inverting input coupled to ground and feedback between its output and inverting input comprising a potentiometer 222 and a resistor 223. The output of operational amplifier 221 forms the output of the logic and is connected to an input terminal 225.

The counter/dividers 152 and 153 divide the frequency received from the voltage controlled oscillator 96. The selective connection between the clock input (JUMPER Z) of counter/divider 152 with one of the outputs (A through G) of counter/divider 155 sets the sampling rate of the logic. Counter/divider 151 divides the frequency generated by the voltage controlled oscillator 95.

The AND/OR select gate 181 sets the conditions for manual or automatic control. The up/down counters 211 and 213 combine to form an eight line (256 bit) counter. The count of the counters can go down only when the system is in manual operation. When in the automatic mode, the count is up only, with the counters preset to zero at the beginning of each correction time period. Thus, the output lines of the latches 216 and 217 hold data acquired during the last sampling of correction time period. Data acquired during the next sampling period is transferred at the end of each sampling period.

The digital-to-analog converter 220 converts the weighted count value from the latches to an analog current. Operational amplifier 221 scales the current output voltage of the digital-to-analog converter to a scale of zero to five volts. This is the output signal of the logic, and when so scaled, becomes the control signal for the pressure control interface 24 of FIG. 1 as shown in detail in FIG. 8.

Figure 8:
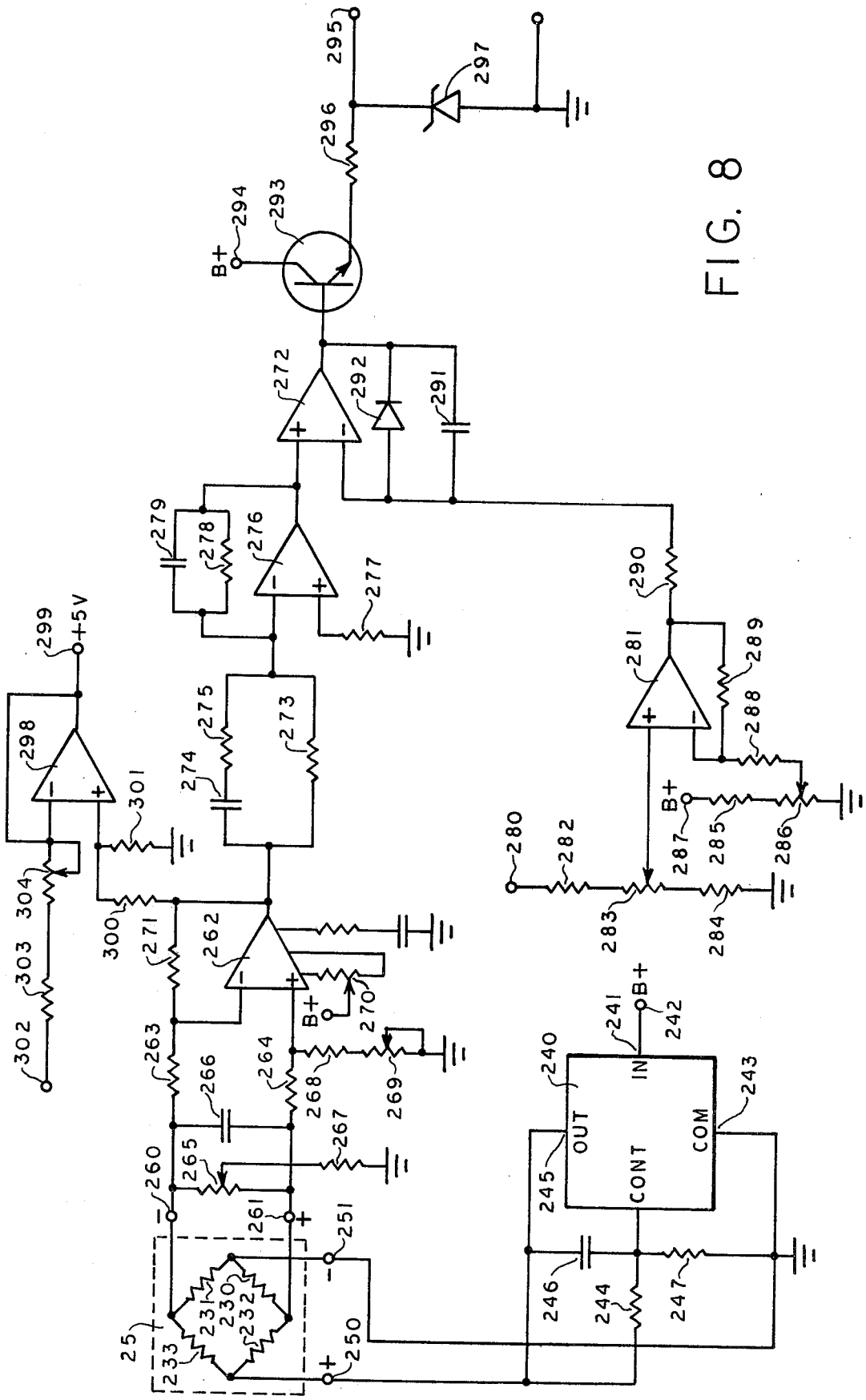
FIG. 8 is a schematic circuit diagram illustrating the equivalent circuit of the strain gauge type pressure transducer of FIG. 1 and the pressure control interface of the control system of FIG. 1.

Referring now to FIG. 8, it shows an equivalent circuit diagram of the strain gauge pressure transducer 25 and the pressure control interface 24. As can be seen from the drawing, the pressure transducer 25 forms a resistive bridge comprising resistors 230 through 233. The junction of resistors 232 and 233 forms one input of the pressure transducer and the junction of resistors 230 and 231 forms the other input of the transducer, which inputs receive actuating voltages from the pressure control interface. The voltages applied to the transducer 25 are provided by a voltage regulator 240 which has an input 241 connected to a positive voltage source at terminal 242. The regulator 240 has a common output 243 connected to ground and a continuity input connected to the transducer positive terminal 250 by a resistor 244. The output of the regulator 245 is connected to the continuity output by a capacitor 246 and the continuity output is also connected to ground by a resistor 247. The positive output of the regulator output 245 is connected to the positive terminal 250 of the transducer and the grounded common output 243 is connected to the negative terminal 251 of the transducer. The transducer senses the pressure within the steam tubes which causes an imbalance in the resistive bridge comprising resistors 230 through 233. This causes a proportional voltage differential across the output terminals 234 and 235 of the transducer. Hence, change in pressure on the transducer causes a proportional voltage differential across its outputs. The voltage differential produced thereacross is related to the pressure of the steam within the steam tubes and is utilized by the pressure control interface in maintaining the steam pressure substantially constant during the successive correction time intervals. The output of the transducer 25 is connected to input terminals 260 and 262 of the pressure control interface circuit.

The pressure control interface circuit includes an operational amplifier 262 having an inverting input connected to the input terminal 260 by a resistor 263. Operational amplifier 262 also has a non-inverting input coupled to the input terminal 261 by a resistor 264. Coupled across the input terminals is a potentiometer 265 and a capacitor 266. The wiper of the potentiometer 265 is coupled to ground by a resistor 267. The non-inverting input of operational amplifier 262 is also coupled to ground by a resistor 268 and a potentiometer 269. Resistor 270 is provided in association with the operational amplifier 262 to provide an offset adjustment. Feedback between the output and the inverting input of operational amplifier 262 is provided by a resistor 271.

The output of operational amplifier 262 is coupled to the non-inverting input of operational amplifier 272 by a lead-lag circuit comprising the parallel connection of a resistor 273 with the series combination of capacitor 274 and resistor 275. The junction of resistors 275 and 273 are coupled to the inverting input of an operational amplifier 276. The non-inverting input of operational amplifier 276 is coupled to ground by a resistor 277. Feedback is provided between the output and inverting input of the operational amplifier 276 by the parallel combination of resistor 278 and capacitor 279. The output of operational amplifier 276 is connected to the non-inverting input of operational amplifier 272.

The inverting input of operational amplifier 272 is connected to the output terminal 225 of the logic of FIGS. 5 and 6. To that end, the output terminal 225 of the logic is coupled to input terminal 280 of the pressure control interface circuit. Terminal 280 is coupled to the non-inverting input of an operational amplifier 281 by a voltage divider comprising resistor 282, potentiometer 283, and resistor 284. The inverting input of operational amplifier 281 is coupled to a reference potential derived from a voltage divider comprising resistor 285 and potentiometer 286 which are connected to a positive voltage terminal 287. The wiper of potentiometer 286 is coupled to the inverting input of operational amplifer 281 by a resistor 288. Feedback between the output and inverting input of operational amplifier 281 is provided by a resistor 289. The output of operational amplifier 281 is then coupled to the inverting input of operational amplifier 272 by a resistor 290. Coupled between the output and the inverting input of operational amplifier 272 are a capacitor 291 and a diode 292. The output of operational amplifier 272 is coupled to the base of transistor 293. Transistor 293 has a collector connected to a positive voltage source at terminal 294 and an emitter coupled to the steam valve actuator 13 (FIG. 1) at a terminal 295 by a resistor 296. A zener diode 297 couples the terminal 295 to ground.

The differential voltage across input terminals 260 and 261 is amplified by operational amplifier 262. Potentiometer 265 comprises a bridge balance potentiometer which balances the bridge for zero volts upon the sensing of zero pressure. Potentiometer 269 is a common mode adjust potentiometer which adjusts operational amplifier 262 to equal gain on each of its inputs. As previously explained, resistor 270 is an amplifier offset adjustment.

The operational amplifier 298 provides a voltage between zero and five volts for a pressure indicator. Its output is connected to a positive five volt voltage source at terminal 299 and has a non-inverting input connected to the output of operational amplifier 262 by a resistor 300. A resistor 301 also couples the non-inverting input of operational amplifier 298 to ground forming with resistor 300 a voltage divider. The inverting input of operational amplifier 298 is coupled to the pressure meter which is connected to a terminal 302. Terminal 302 is connected to the inverting input of operational amplifier 298 by a resistor 303 and potentiometer 304.

Terminal 280 is connected to the logic output terminal 225 which provides a signal, as previously explained, having a magnitude related to the average moisture content during the immediately preceding correction time interval. That signal may be considered as a command signal to the pressure control loop. Potentiometer 283 attenuates the voltage at terminal 280 to a value such that the desired maximum pressure is achieved when terminal 280 is approximately minus five volts. Potentiometer 286 is a minimum pressure adjustment such that the pressure cannot drop below a predetermined minimum pressure for zero volts on terminal 280. Thus, if a 20 pounds per square inch minimum pressure is required, potentiometer 286 is adjusted so that the pressure is 20 pounds per square inch when zero volts is applied to terminal 280. If the maximum required pressure is 100 pounds per square inch, potentiometer 283 is adjusted until 100 pounds per square inch achieves five volts at terminal 280.

Operational amplifier 272 is the summing amplifier which saturates with positive output voltage when the command voltage at its inverting input exceeds the pressure feedback voltage at its non-inverting input. Positive voltage at the output of operational amplifier 272 biases transistor 293 for supplying current through terminal 295 to the steam valve actuator to provide the appropriate correction to the opening of the steam valve. When transistor 293 is biased on, control current flows, the steam valve opens, and the subsequent higher pressure is sensed at the non-inverting input of operational amplifier 272. The system is in balance when the voltages at the inputs of operational amplifier 272 are equal. Diode 292 prevents excessive negative voltage on transistor 293.

At the beginning of each correction time interval, a signal is applied to terminal 280 having a magnitude indicative of the degree of correction necessary to be made to the valve opening to effect drying of the meal to the desired set point. However, during the correction time intervals between the correction times, the pressure within the steam tubes is maintained constant by the pressure control interface including transducer 25. Because the voltage at terminal 288 remains constant during each correction time interval, it serves as a reference for detecting decreased pressure within the steam tubes. Hence, should the pressure decrease in the steam tubes during a correction time interval, the pressure decrease will be sensed by the transducer 25 causing a differential voltage at input terminals 260 and 261 which ultimately results in an imbalance at operational amplifier 272. That imbalance will cause the operational amplifier 272 to saturate positive to turn on transistor 293. As a result, additional control current is supplied to the steam valve actuator at terminal 295 to effect the proper correction to the steam valve opening and to return the pressure level to that dictated by the voltage level at terminal 280.

Referring now once again to FIGS. 5 and 6, the operation of the logic will now be described for both the manual and automatic modes of system operation.

Logic Gates 177 and 176 comprise an internal clock oscillator. Its output is applied to terminal A1 of select gate 181 and hence to terminal D1 since control input Ka is high on manual control. The direction of the count of counters 211 and 213 is determined by operational amplifier 190. If operational amplifier 190 provides a high output, terminal D4 is high and the counters count up. A low output from operational amplifier 190 causes a down count. The inputs to operational amplifier 190 are connected to the output of the moisture direction circuit of FIG. 10. Comparator 200 of that circuit saturates positive when the output of the logic has the higher absolute value than the output of the manual potentiometer connected at terminal 201. When the output of the manual potentiometer is higher, operational amplifier 200 saturates at negative polarity. If the output polarity is negative, the logic output is too low. The negative signal applied to operational amplifier 190 on the logic results in a positive signal at terminal A4 and at terminal D4 of the select gate. As a result, the counters count up, and the analog voltage output of the digital-to-analog converter increases until the output of the logic equals the output of the manual potentiometer at terminal 201. The output thus hunts with low amplitude around the value commanded by the manual potentiometer connected to terminal 201. Latches 216 and 217 transfer data continuously during manual operation. The digital-to-analog converter 220 continuously updates upon receiving the data from the latches 216 and 217.

During the automatic mode of operation, the D input of flip-flop 167 is grounded. The D input of flip-flop 167 is coupled to the output of NOR gate 310 of the circuit of FIG. 9. Referring to that figure for a moment, it can be seen that NOR gate 310 has a pair of inputs which are coupled to the output of a NOR gate 311. NOR gate 311 has one input coupled to an auto/manual switch (not shown) at terminal 312 and to ground by a resistor 313. NOR gate 311 has another input connected to a positive voltage source at a terminal 314 by a capacitor 315, a resistor 316, and a resistor 317. A resistor 318 connects the output of NOR gate 310 with the input of NOR gate 311. When the auto/manual switch is placed in the automatic mode, a logical O signal results at the output of NOR gate 310 which effectively grounds the D input of flip-flop 167.

Because the D input of flip-flop 167 is effectively grounded, the Q output of flip-flop 167 and thus the Ka control input of select gate 181 go high. Thus, data on the B terminals is transferred through to the D output terminals. Terminal B2 goes high when the Q8 output of counter/divider 152 goes low. Terminal D2 follows terminal B2 and therefore, latches 216 and 217 at their enable inputs go high causing the latches to transfer data to their outputs and thus to the digital-to-analog converter 220. As a result, the analog signal provided by the digital-to-analog converter is changed or updated for the next correction interval. Terminal B3 is pulsed high on empty cell. Terminal D3 goes high when terminal B3 goes high, presetting the counters 211 and 213 to zero count. The empty cell signal also resets all the counters 151, 152 and 155 to zero. Terminal B1 receives the divided frequency count from the selected output of counter 151. Terminal D1 transfers the divided frequency into the counters 211 and 213.

Assuming the delay through the dryer is 30 minutes, reference to the table of FIG. 7 indicates that, for a 30-minute dryer through time, JUMPER Z at the clock input of counter 152 is to be connected to the "B" output ($Q_{10}$) of counter 155, JUMPER M at terminal B1 of select gate 181 is to be connected to the output "3" ($Q_B$) of counter 151, and JUMPER K is to be connected to the $\frac{1}{4}$ position. The connection of JUMPER Z to output B of counter 155 results in the time frequency being divided by $2^{18}$. ($Q_{10}=2^{10}$, $Q_8=2^8$). With JUMPER K being connected to the $\frac{1}{4}$ position, the error clock input is shorted until counter 152 at its $Q_7$ input and $Q_8$ input go high. Thus, error count does not accumulate until the last 25% of the time interval. The error count is divided by $2^8$. If the error clock frequency is the same as the time interval frequency, the accumulated error count will be 256, which is the full capacity of counters 211 and 213. This is shown as follows:

Time interval = $2^{18}/f_{tc}$ where $f_{tc}$ = frequency of the time clock $\frac{1}{4}$ time interval = $2^{16}/f_{tc}$ if fe = $f_{tc}$ (fe = frequency of the error clock) error count = $(2^{16}/f_{tc})\cdot(fe/2^8) = 2^8 = 256$ The count accumulated in counters 211 and 213 depends on the average error over the time interval.

Sequential operation during a sampling interval is as follows. Latches 216 and 217 have just transferred their contents and are latched at the new value. The digital-to-analog converter analog output is at the value determined by the weights on its input lines. The error frequency is shorted out through counter 152 with $Q_7$ and $Q_8$ being at ground potential.

The time frequency count is accumulated until $Q_7$ and $Q_8$ inputs both go high. The $Q_8$ input sets the flip-flop 160 Q output high driving the NOR gate 163 output low. The low output from NOR gate 163 drives terminal B2 low, and D2 low of the select gate 181. Also, the clock inputs of latches 216 and 217 go low. The outputs of the latches remain constant regardless of the input.

With outputs $Q_7$ and $Q_8$ of counter 152 high, counter 151 pulses high on the selected jumper each time the counter cycles through. If jumper 3 is selected, it goes high for every $2^8$ (256) cycles. This divided count is applied to the counters 211 and 213 through terminals B1 and D1 of select gate 181 and through NOR gate 211. Error count accumulates through the last quarter of the time period determined by the Z jumper setting. The amount of count accumulated depends on the magnitude of error detected.

When output $Q_8$ of counter 152 goes low signifying the end of the timing period, the Q output of flip-flop 160 goes low, making the output of NOR gate 163 high. Thus, terminal B2 of select gate 181 goes high making its terminal D2 also go high and placing a logical 1 on latches 216 and 217 at their enable inputs causing the input of the latches to transfer data to their outputs. The new value on the outputs of the latches causes a new output to appear from the digital-to-analog converter.

If the error signal remains the same from one interval to the next, the same count will be accumulated during each time interval.

The output of the logic commands a steam pressure valve. The pressure remains constant during the sampling interval by virtue of the pressure control loop. If steam pressure is sufficient to maintain the required moisture, no change will be made. If a net error is averaged out during the last one quarter of the sampling period, a pressure correction will be made.

While a particular embodiment of the present invention has been shown and described, modifications may be made, and it is therefore intended to cover in the appended claims all such changes and modifications which fall within the true spirit and scope of the invention.

The invention is claimed as follows:

1. A product moisture control system for use in a product steam dryer of the type which removes moisture from wet product material, wherein the wet product material is contacted with steam conduit means for heating the wet material and evaporating the moisture therein and wherein the resulting evaporation is thereafter removed from the processed material, said control system comprising: moisture detecting means for determining the moisture content of the processed product material; steam pressure control means responsive to said moisture detecting means for establishing a desired steam pressure within the steam conduit means at times separated by predetermined time intervals and in accordance with the moisture content of the processed product material; steam pressure detecting means for continuously sensing the steam pressure within the steam conduit means and being coupled to said steam pressure control means for causing said steam pressure control means to maintain the steam pressure within the steam conduit means substantially at said desired steam pressure during each said predetermined time interval; and selectively adjustable timing control means for adjusting the duration of said predetermined time intervals in accordance with the throughput time of the product steam dryer.

2. A system as defined in claim 1 further comprising moisture content setpoint means for setting a desired moisture content of the processed material, comparing means for determining the difference between said determined moisture content and said moisture content setpoint and for providing a difference signal related to said difference, and wherein said steam pressure control means is arranged to establish said desired steam pressure within said conduit means at said times separated by predetermined time intervals responsive to said difference signal.

3. A system as defined in claim 2, said steam pressure control means further comprising control signal deriving means for deriving a control signal at said times separated by predetermined time intervals from said difference signal and for causing said steam pressure control means to establish said desired steam pressure at said times separated by predetermined time intervals.

4. A system as defined in claim 3 wherein said control signal deriving means comprises oscillator means for providing a signal having a frequency related to said difference signal and logic means for providing said control signal responsive to said oscillator frequency.

5. A system as defined in claim 4 wherein said oscillator means is arranged to provide said oscillator frequency responsive to a present difference signal and to a preceding control signal developed by said logic means during the predetermined time interval immediately preceding the time at which said difference signal was developed.

6. A system as defined in claim 5, wherein said logic means includes means for sensing said oscillator frequency during a predetermined portion of each said predetermined time interval and for providing said control signal based upon the difference between said determined moisture content and said moisture content setpoint during said predetermined portion.

7. A system as defined in claim 6 wherein said logic means includes averaging means for averaging the oscillator frequencies during said predetermined portions and providing said control signal based upon the average difference between said determined moisture content and said moisture content setpoint during said predetermined portions.

8. A system as defined in claim 2 wherein said steam pressure detecting means includes steam pressure signal means for providing a signal having a magnitude related to the steam pressure within the steam conduit means, comparator means coupled to said steam pressure signal means and to said comparing means for providing a second control signal responsive to said steam pressure signal and said difference signal for causing said steam pressure control means to maintain the steam pressure constant during said time intervals.

9. A system as defined in claim 8 wherein said steam pressure detecting means includes a strain gage transducer including a resistance bridge circuit for providing an electrical signal having a magnitude related to the steam pressure within the steam conduit means.

10. A product moisture control system for use in a product steam dryer of the type wherein wet product material is heated by steam tubes to evaporate the moisture in the product material, wherein the resulting evaporation is removed from the dryer, and wherein the level of steam pressure within the steam tubes determines the final moisture content of the processed product material, said product moisture control system comprising: moisture setpoint means for selecting a desired moisture content level for the processed product material; valve means for controlling the steam pressure within the steam tubes; moisture control sensing means for detecting the moisture content of the processed product material and arranged to coact with said setpoint means for causing said valve means at times separated by predetermined time intervals to establish a required steam pressure level within the steam tubes for providing processed product material having said desired moisture content; steam pressure sensing means for continuously detecting the steam pressure within the steam tubes and for causing said valve means to maintain the steam pressure substantially at said required level during each said predetermined time interval; and selectively adjustable timing control means for adjusting the duration of said predetermined time intervals in accordance with the throughput time of the product steam dryer.

11. In a control system for a steam dryer wherein material passing therethrough is heated by steam tubes, said steam tubes having steam pressure control means, the combination comprising: moisture sensing means for sensing the moisture content of processed material leaving the dryer, adjusting means connected with and responsive to said moisture sensing means for making periodic adjustments of said control means for adjusting the steam pressure to a desired level in accordance with the moisture content of the processed material, pressure sensing means for continuously sensing steam pressure within the steam tubes, further adjusting means responsive to said pressure sensing means for continuously adjusting the steam pressure control means between said periodic adjustments for substantially maintaining said desired level of pressure; and selectively adjustable timing control means for adjusting timing of said periodic steam pressure adjustments in accordance with the throughput time of the steam dryer.

12. A system as defined in claim 11 further including setpoint means for selecting a desired moisture content of the processed material and difference means coupled to said setpoint means and said sensing means for determining the difference between said desired moisture content and said sensed moisture content, and wherein said adjusting means is responsive to said difference means for providing said periodic adjustments in the steam pressure.

13. A system as defined in claim 12 wherein said adjusting means provides an adjustment signal to said control means, wherein said pressure sensing means provides a pressure signal having a magnitude related to said sensed pressure, and wherein said pressure sensing means includes means for comparing said pressure signal to said adjustment signal for substantially maintaining said desired level of pressure.

14. A system as defined in claim 13 wherein said pressure sensing means includes a strain gage pressure transducer including a resistive bridge for providing said pressure signal.

15. A product moisture control system for use in a product steam dryer of the type which removes moisture from wet product material, wherein the wet product material is contacted with steam conduit means for heating the wet material and evaporating the moisture therein and wherein the resulting evaporation is thereafter removed from the processed material, said control system comprising: moisture detecting means for determining the moisture content of the processed product material; steam pressure control means responsive to said moisture detecting means for establishing a desired steam pressure within the steam conduit means at predetermined time intervals and in accordance with the moisture content of the processed product material; steam pressure detecting means for continuously sensing the steam pressure within the steam conduit means and being coupled to said steam pressure control means for causing said steam pressure control means to maintain the steam pressure within the steam conduit means substantially at said desired steam pressure during each said time interval; moisture content setpoint means for setting a desired moisture content of the processed material; an comparing means for determining the difference between said determined moisture content and said moisture content setpoint and for providing a difference signal related to said difference, wherein said steam pressure control means is arranged to establish said desired steam pressure within said conduit means at said predetermined time intervals responsive to said difference signal, said steam pressure control means further comprising control signal deriving means for deriving a control signal at said predetermined time intervals from said difference signal and for causing said steam pressure control means to establish said desired steam pressure at said predetermined time intervals, wherein said control signal deriving means comprises oscillator means for providing a signal having a frequency related to said difference signal and logic means for providing said control signal responsive to said oscillator frequency, and wherein said oscillator means is arranged to provide said oscillator frequency responsive to a present difference signal and to a preceding control signal developed by said logic means during the predetermined time interval immediately preceding the time at which said difference signal was developed.

16. A system as defined in claim 15 and further including selectively adjustable timing control means for adjusting the duration of said predetermined time intervals in accordance with the throughput time of the product steam dryer.

* * * * *